United States Patent [19]

Marcerou et al.

[11] Patent Number: 5,134,517
[45] Date of Patent: Jul. 28, 1992

[54] ERBIUM-DOPED FIBER OPTICAL AMPLIFIER

[75] Inventors: Jean-Francois Marcerou, Courcouronnes; Hervé Fevrier, Massy; Jacques Auge, Saint Cheron, all of France

[73] Assignee: Alcatel N.V., Amsterdam, Netherlands

[21] Appl. No.: 665,533

[22] Filed: Mar. 6, 1991

[30] Foreign Application Priority Data

Mar. 16, 1990 [FR] France ............... 90 03399

[51] Int. Cl.$^5$ ............... H01S 3/06; H01S 3/30; G02B 6/00
[52] U.S. Cl. ............... 359/341; 385/5; 372/6
[58] Field of Search ............... 330/4.3; 372/6; 350/96.13, 96.31; 359/341; 385/5

[56] References Cited

U.S. PATENT DOCUMENTS 3,950,707 4/1976 Hill et al. ............... 330/4.3
4,952,225 8/1990 Le Sergent et al. ............... 65/312
5,005,175 4/1991 Desurvire et al. ............... 372/6

FOREIGN PATENT DOCUMENTS 8714286 10/1986 France .

OTHER PUBLICATIONS

J. L. Zyskind et al, "Optimization of Erbium . . . ", SPIE Conf, Boston (USA), Sep. 1989, SPIE vol. 1171 Fiber Laser Sources & Amplifiers (1989), pp. 137–136.
M. Shimizu, et al, Post-deadline Paper No. 17, "Compact and Highly Efficient . . . ", OFC Conf, San Francisco (USA), Jan. 1990, NTT Optoelectronics Labs., Japan.

*Primary Examiner*—Nelson Moskowitz
*Attorney, Agent, or Firm*—Christie, Parker & Hale

[57] ABSTRACT

An erbium-doped fiber optical amplifier, characterized in that said fiber has a mode radius which is not greater than 2.7 μm at a wavelength of 1.55 μm, and in that it has at least one pump wavelength situated in the following regions of the spectrum: 0.98 μm±0.4 μm and 1.48 μm±0.4 μm; the region of the spectrum of at least one signal to be amplified being 1.5 μm to 1.6 μm.

3 Claims, 1 Drawing Sheet

ERBIUM-DOPED FIBER OPTICAL AMPLIFIER

The present invention relates to an erbium-doped fiber optical amplifier, which is applicable, in particular, to underwater optical fiber telecommunications.

Erbium-doped optical fiber amplifiers have the specific feature of obtaining high gains on a single pass of a signal, in the 1.5 μm to 1.6 μm region of the spectrum, and for optical pumping powers that are low, about 1 mW to about 150 mW.

The stability of the amplification process in a fiber depends, inter alia, on the mode noise of the optical pump. It is therefore preferable for the amplifier to operate on the principle that the optical pump and the signal to be amplified are both monomode, the mode cutoff wavelength $LP_{11}$ of the amplifying fiber thus being lower than the wavelength of the pump. This restricts the pumping wavelength to the following regions of the spectrum: 0.98 μm±0.04 μm and 1.48 μm±0.04 μm.

An analysis of the efficiency of the processes governing amplifiers may be conducted by analyzing the gain coefficient g obtained by dividing the net gain G of the amplifying fiber, expressed in dB, by the optical pumping power, expressed in mW. This coefficient is thus expressed in dB/mW.

Optical amplifiers known for giving the best performance are described in the following two articles:

1 J. L. ZYSKIND, J. R. SIMPSON, C. R. GILES and E. DESURVIRE, Paper No. 1171-13, SPIE Conference, Boston (USA), September 1989; and 2 M. SHIMIZU, M. HORIGUCHI, M. YAMADA, I. MISHI, S. UEHARA, J. NODA, and E. SUGITA, Post-deadline Paper No. 17, OFC Conference, San Francisco (USA), January 1990.

Article 1 discloses a gain coefficient g of 2.6 dB/mW for a pump power of 10 mW situated in the 1.48 μm region of the spectrum; the corresponding fiber has a mode radius $w_o$ equal to 2.71 μm at a wavelength of 1.55 μm.

Article 2 indicates a gain coefficient g of 4.9 dB/mW for a pump power of 5 mW situated in the 0.98 μm region of the spectrum; the fiber has a mode radius $w_o$ equal to 2.99 μm at a wavelength of 1.55 μm. Neither of these two articles specifies the radial distribution of erbium in the fiber.

An object of the present invention is to provide optical amplifiers whose amplifying fibers give better performance, and therefore better gain coefficients than those currently known. To achieve this, the present invention proposes optimizing the parameters of the fiber and optimizing the radial positioning of the erbium.

The present invention provides an erbium-doped fiber optical amplifier, characterized in that said fiber has a mode radius which is not greater than 2.7 μm at a wavelength of 1.55 μm, and in that it has a least one pump wavelength situated in the following regions of the spectrum: 0.98 μm±0.4 μm and 1.48 μm±0.4 μm; the region of the spectrum of at least one signal to be amplified being 1.5 μm to 1.6 μm.

Surprisingly, although a deterioration in the signal to noise ratio due to the reduction in mode radius might have been expected, it is observed that an amplifier of the invention has a gain coefficient g which may reach values higher than 5 dB/mW without significant deterioration in this signal to noise ratio.

The gain coefficient g of said fiber is improved by a reduction in the pump power threshold necessary for achieving a gain of 0 dB over an optimum length of the amplifying fiber. The higher the gains that are obtained for low pump powers, the greater the value of this coefficient. This threshold is improved by an increase in the optical power density of the pump, and therefore by a reduction in the mode radius at the pump wavelength and also at the signal wavelength.

Authors such as J. R. Armitage in an article which appeared in "Applied Optics, 27, 1988 pages 4,831 to 4,836" who have already tried to optimize the parameters of the amplifying fiber have not shown the essential role of the mode radius $w_o$.

In a preferred embodiment, the core radius R of the fiber lies in the range 1.2 μm to 1.6 μm: e.g. it is equal to 1.5 μm; the index difference Δn between the core and the cladding of the fiber lies in the range $25 \times 10^{-3}$ to $35 \times 10^{-3}$: e.g. Δn is equal to $30 \times 10^{-3}$.

In an improvement, the radial distribution of erbium in the core of the fiber is not uniform; this distribution is centered on the axis of symmetry of the fiber, and the half-height width r of this radial distribution is less than one-third of the core radius R.

Other characteristics and advantages of the present invention appear from the following description of embodiments given by way of non-limiting illustration.

Four fiber amplifiers were studied: fibers 1 and 2 were fibers of the invention and fibers 3 and 4 were fibers of prior art. Each of the four fibers had erbium uniformly distributed in its core.

For each fiber, Table I gives the optimum length L (in meters), the value of the index difference Δn, the core radius R (in μm), the mode radius $w_o$ (in μm), the gain G (in dB), and the gain coefficient g (in dB/mW).

The results given in Table I correspond to a pump power of 10 mW at 1.476 μm with an input signal of 0.1 μW at 1.532 μm.

TABLE I

|  | Fiber 1 | Fiber 2 | Fiber 3 | Fiber 4 |
| --- | --- | --- | --- | --- |
| L (m) | 28 | 28 | 12 | 24 |
| Δn | $30 \times 10^{-3}$ | $25 \times 10^{-3}$ | $10 \times 10^{-3}$ | $20 \times 10^{-3}$ |
| R (μm) | 1.5 | 1.5 | 3.5 | 2.5 |
| $w_o$ (μm) | 2.10 | 2.32 | 3.82 | 2.71 |
| G (dB) | 31.7 | 31.2 | 7.2 | 24.1 |
| g (dB/mW) | 3.2 | 3.1 | 0.7 | 2.4 |

It was also noted that the fibers 1 and 2 of the invention did not show any deterioration in signal to noise ratio compared with fibers 3 and 4.

Figure 1:
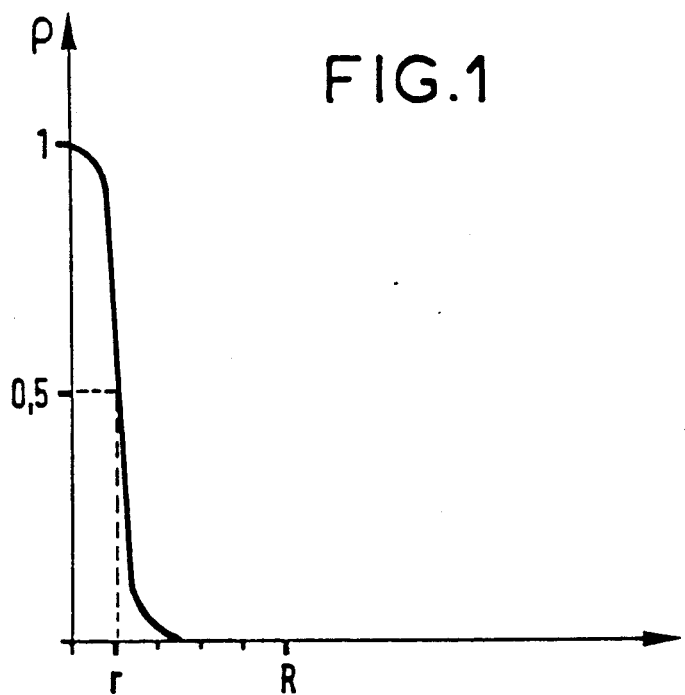
FIG. 1 shows the radial distribution ρ of erbium in an example of fiber of the invention.

In an improvement, the radial distribution of erbium in the fiber is not uniform, e.g. it is in accordance with FIG. 1. The profile of the erbium distribution ρ is defined by its half-height width r being equal to one-fifth of the fiber core radius R. The central position of the doped zone coincides with the energy maximum of the fundamental mode of the pump.

Fibers 5 and 6 are both fibers of the invention, fiber 5 having erbium distribution in accordance with FIG. 1 and fiber 6 having uniform distribution.

Table II below gives results for these two fibers corresponding to a pump power of 5 mW at 1.476 μm with an incident signal of 0.1 μW at 1.532 μm.

TABLE II

|  | Fiber 5 | Fiber 6 |
|---|---|---|
| L (m) | 24 | 22 |
| Δn | $30 \times 10^{-3}$ | $30 \times 10^{-3}$ |
| R (μm) | 1.5 | 1.5 |
| $w_o$ (μm) | 2.1 | 2.1 |
| G (dB) | 27.4 | 22.6 |
| g (dB/mW) | 5.5 | 4.5 |

With fiber 5, a gain coefficient g of greater than 5 dB/mW was obtained.

Figure 2:
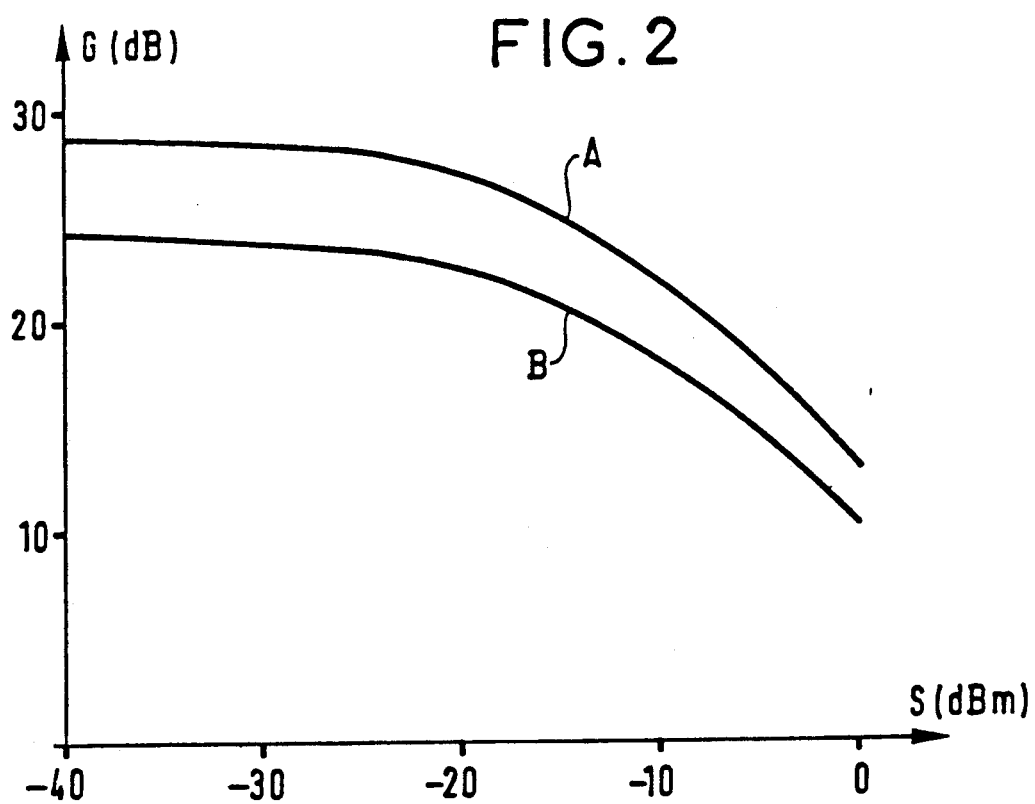
FIG. 2 shows curves of variation in gain G (in dB) as a function of the strength (in dBm) of the signal input to the amplifier (1 dBm corresponds to 0 mW) both for a fiber of the invention and for a prior art fiber.

In FIG. 2, for two fibers analogous to fibers 2 and 3, two curves respectively referenced A and B show variation in gain G (in dB) as a function of the input signal strength S (in dBm) at 1.55 μm. The pump power was 25 mW at 1.48 μm and each fiber was at its optimum length.

Comparing the two curves shows that, relative to curve B, curve A in accordance with the invention demonstrates a clear improvement in gain coefficient for weak incident signals, and a great improvement in the overall efficiency of the amplifying process for signals strong enough to cause amplification to saturate.

Amplifiers designed in accordance with the present invention may, for example, work at low saturation power and at high gain, which is advantageous for an amplifier inserted in a transmission line.

The improvement in the performance of an amplifier of the invention is thus apparent regardless of its operating conditions with:

pumping lying in the following regions of the spectrum: 0.98 μm±0.4 μm and 1.48 μm±0.04 μm;

signals incident on the fiber being weak or strong at wavelengths lying within the 1.5 μm to 1.6 μm region of the spectrum; and the amplifier being positioned anywhere along the transmission line.

A fiber of the invention may be made, for example, from a preform obtained in compliance with the teaching of commonly assigned U.S. Pat. No. 4,952,225 claiming priority from French patent No. BF 87 14 286 dated Oct. 16, 1987.

Of course, the invention is not limited to the examples described, in particular as regards the curve showing the radial distribution of erbium in the fiber, and the values of the core radius and of the index difference Δn.

We claim:

1. An erbium-doped fiber optical amplifier, wherein
the gain coefficient g if the amplifier, equal to the relationship between the net gain G (dB) and the pump power (mW), is at least 5 dB/mW,
the spectral region of at least one signal to be amplified is from 1.5 to 1.6 μm,
the amplifier has at least one pump wavelength situated in one of the following regions of the spectrum: 0.98 μm±0.04 μm and 1.48 μm±0.04,
the pump power is less than or equal to 10 mW at a wavelength of 1.55 μm,
the erbium-doped fiber presents a mode radius less than or equal to 2.7 μm at the wavelength 1.55 μm, and
the erbium is located within the core of said fiber such that the radial distribution of the erbium is centered on the axis of symmetry of said fiber and the half-height width of said radial distribution is less than one-third of the core radius.

2. An erbium-doped fiber optical amplifier according to claim 1, wherein
the core radius of said fiber lies in the range 1.2 μm to 1.6 μm, and
the index difference Δn between the core and the cladding of the fiber lies in the range $25 \times 10^{-3}$ to $35 \times 10^{-3}$.

3. An erbium-doped fiber optical amplifier according to claim 2, wherein said core radius is substantially equal to 1.5 μm, and said index difference $\Delta_n$ is substantially equal to $30 \times 10^{-3}$.

* * * * *

UNITED STATES PATENT AND TRADEMARK OFFICE
CERTIFICATE OF CORRECTION

PATENT NO. : 5,134,517
DATED : July 28, 1992
INVENTOR(S) : Jean-Francois Marcerou; Herve Fevrier; Jacques Auge It is certified that error appears in the above-identified patent and that said Letters Patent is hereby corrected as shown below:

Column 1, line 58, before "least" change "a" to -- at --.

Signed and Sealed this

Twelfth Day of October, 1993

Attest:

BRUCE LEHMAN

Attesting Officer

Commissioner of Patents and Trademarks